United States Patent [19]
Picandet

[11] 3,976,841
[45] Aug. 24, 1976

[54] ELECTRONIC TIME SWITCHING TELEPHONE SYSTEM

[75] Inventor: Jean Picandet, Paris, Seine, France

[73] Assignee: Jeumont-Schneider, Puteaux, France

[22] Filed: Jan. 21, 1975

[21] Appl. No.: 542,860

[30] Foreign Application Priority Data
Jan. 25, 1974 France .............................. 74.02478

[52] U.S. Cl. ....................... 179/15 AT; 179/15 BD; 179/27 FE
[51] Int. Cl.² .......................................... H04M 3/20
[58] Field of Search ....... 179/27 FE, 15 BD, 15 AA, 179/15 AT

[56] References Cited
UNITED STATES PATENTS

| | | |
|---|---|---|
| 3,435,150 | 3/1969 | Albrecht .......................... 179/27 FE |
| 3,769,461 | 10/1973 | Lewis .............................. 179/15 AT |
| 3,828,146 | 8/1974 | Lewis .............................. 179/15 AT |

*Primary Examiner*—George H. Libman
*Attorney, Agent, or Firm*—Bacon & Thomas

[57] ABSTRACT

Electronic time switching telephone system so that the operator can listen in, with the ability to break-in and talk to the correspondents connected to the corresponding exchange, the system comprises an interface modem between the operator's line transformer and the connection network.

10 Claims, 6 Drawing Figures

ELECTRONIC TIME SWITCHING TELEPHONE SYSTEM

This invention relates to electronic time switching telephone systems, more particularly to a modem system associated with the operator station connected to an electronic time switching telephone exchange. Such facilities serve as a means for:

a. speech between an operator and any correspondent connected to the exchange, and b. operator monitoring of a call between two correspondents interconnected via the exchange, in which case it must be possible to superimpose a monitoring tone on the telephone speech signals so as to show the correspondents that the operator is monitoring them.

Of course, in an electronic time switching telephone exchange one line is connected to a connection network via a transformer whose primary is connected across the line, the secondary being connected to the connection network by a transmission channel and a reception channel which are separated or isolated from one another by means of a balancer in the transformer. Between the transformer and the connection network the transmission channel comprises an amplifier and an encoder, whereas the reception channel comprises an amplifier and a decoder.

According to the invention, to enable these various operations to be performed, a modem serving as an interface is associated with the operator's line between the transformer thereof and the connection network.

The invention provides an electronic time switching telephone system comprising a connection network to which a number of correspondents' lines and at least one operator line are connected via transformers, the primary of the transformer being connected to the terminals of one of the lines whereas the secondary of such transformer is connected to the connection network via a transmission channel and a reception channel isolated or separated from one another by a balancing facility acting on such secondary winding, the system comprising, between the secondary of the operator's line transformer and the connection network, a modem facility comprising a transmission path and a reception path forming parts of the transmission channel and reception channel respectively, the reception path comprising a demodulator charging up a capacitor and a variable-gain amplifier which outputs signals received from such capacitor to the transformer secondary, whereas the transmission path comprises an amplifier receiving signals from the transformer secondary and transmitting such signals to a capacitor supplying a modulator, means being provided to at least partly cancel the action of the operator's balancing facility.

The signals from the various correspondents, plus the signals of a monitoring warning tone generator, where applicable, which comes into operation when the action of the balancer is cancelled, can therefore be handed by the modem according to the invention.

Of course, for proper operation of the system the communicating correspondents must be allotted different time slots. Also, a special time slot has to be allotted to the tone generator. It is important to provide means for varying the gain of the variable-gain amplifier of the reception path.

Preferably, the means for varying the gain of the variable-gain amplifier and for cancelling the action of the operator's balancing facility are (mechanical or static or electronic) contacts controlled, like the modulator and demodulator, by a central logic control unit. Advantageously, the variable gain amplifier is embodied by an operations amplifier whose gain can be varied by variation of the value of the negative feedback resistors.

Preferably, a low-pass filter is interposed on the reception path between the capacitor and the variable-gain amplifier. Also, an isolating or separating amplifier can be provided between such capacitor and such filter.

In the case in which the balancing facility is in known manner embodied by a resistive arrangement disposed between earth and the centre-point of the transformer secondary, a first contact can be connected in series with the balancing facility, a second contact serving to reduce the gain of the variable-gain amplifier. The first contact can also be connected in series with the balancing facility, the second contact serving as a means of increasing the gain of the variable-gain amplifier, and that end of the transformer secondary which is connected to the transmission channel is earthed through a resistor. If in known manner one of the ends of the transformer secondary is earthed and balancing is provided through the agency of the transmission channel amplifier, which is in such a case an operational amplifier, a first contact can be disposed between earth and the input of the amplifier which is not connected to the transformer secondary, the second contact being a means of increasing the gain of the variable-gain amplifier.

A clear understanding of how the invention may be carried into effect can be gathered from the accompanying drawings wherein.

Figure 3:
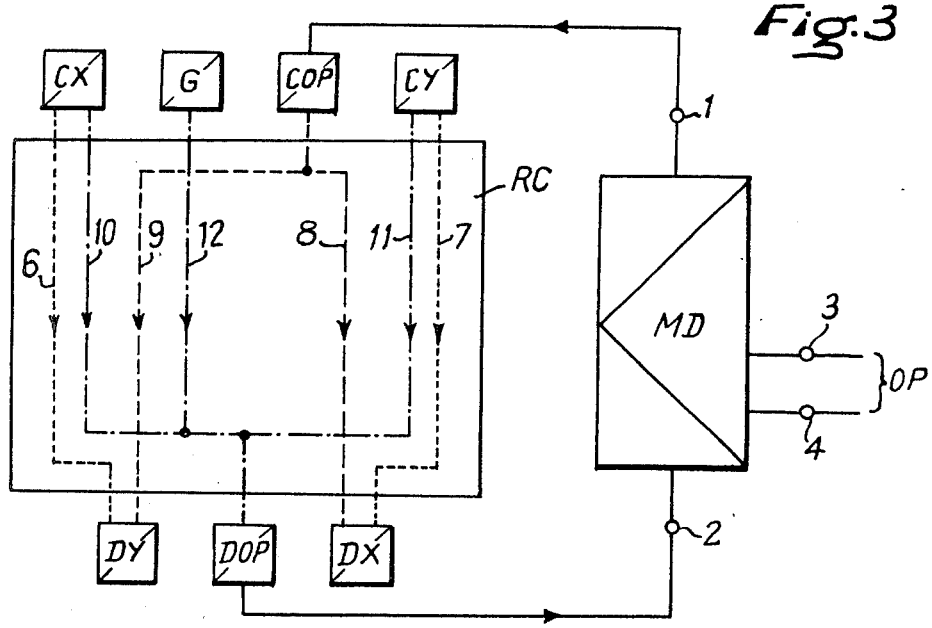

FIG. 3 diagrammatically shows how the invention operates, and

Figure 4:
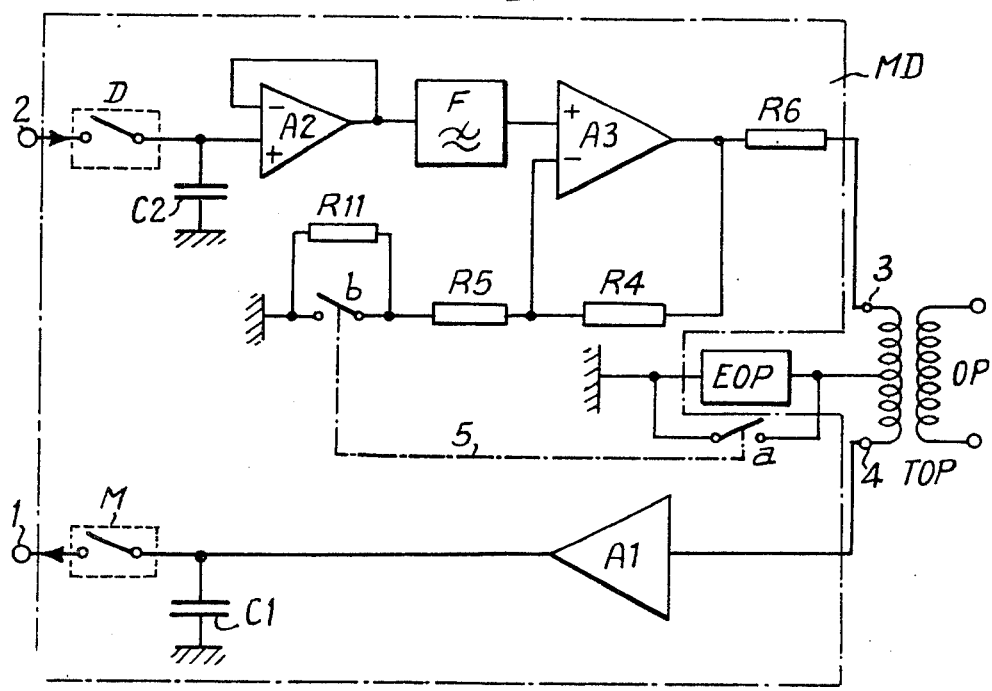
Figure 5:
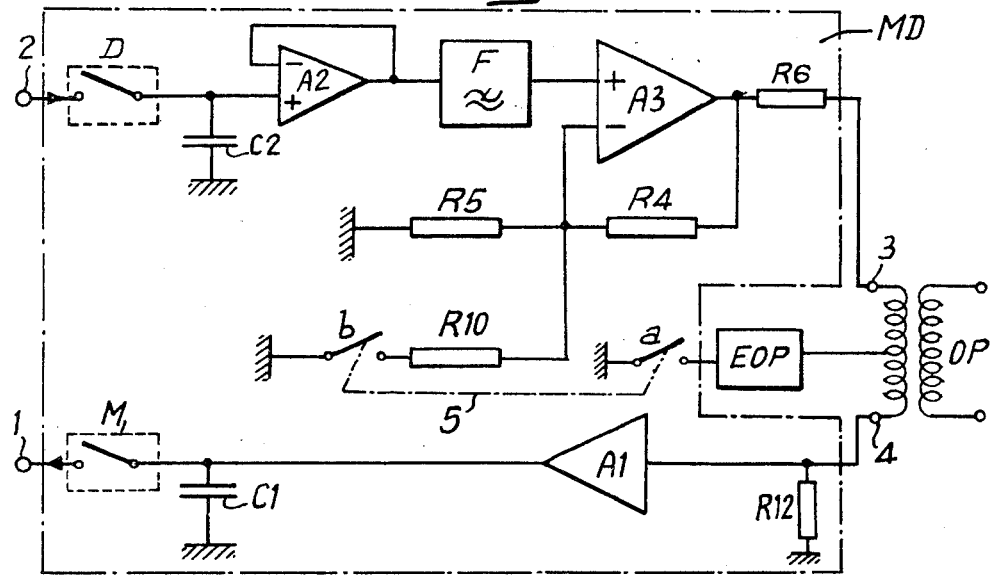
Figure 6:
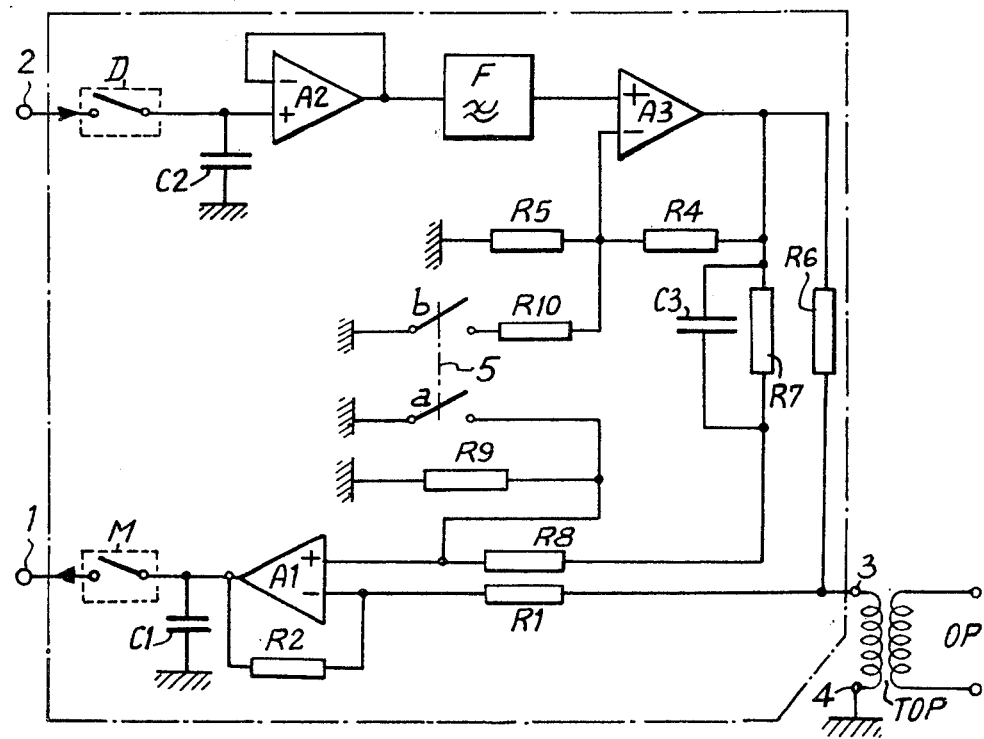

FIGS. 4 to 6 show embodiments of the modem according to the invention.

Like references denotes like elements throughout the drawings.

Figure 1:
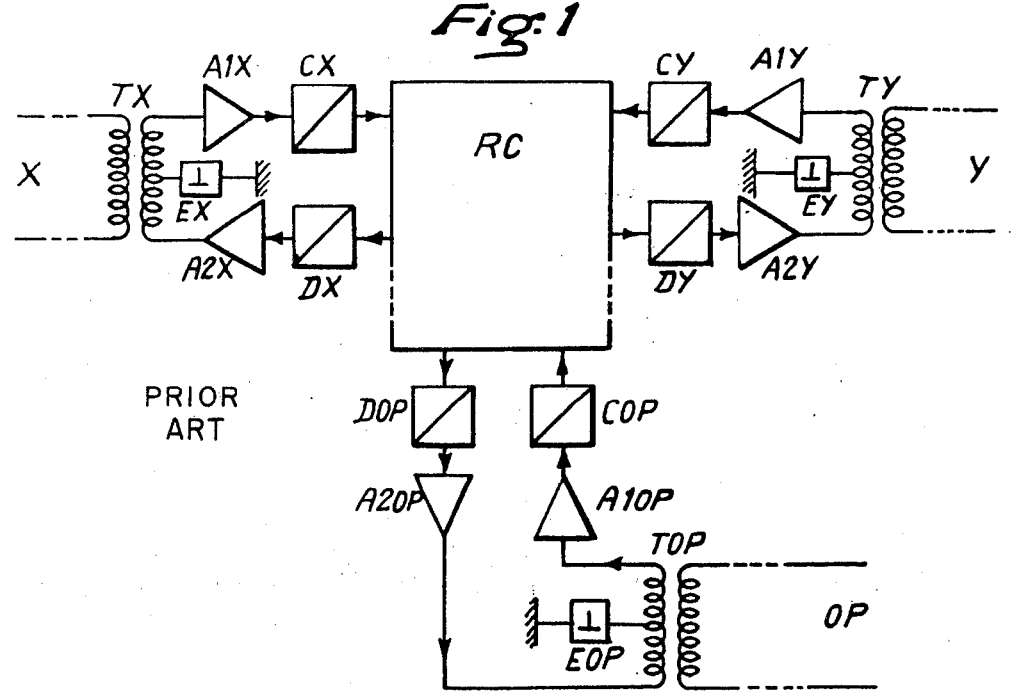
FIG. 1 is a diagrammatic view of a known kind of electronic time switch in telephone system to which the invention relates.

FIG. 1 is a diagrammatic view of an electronic time switching telephone system comprising a connection network RC via which the lines of subscribers X and Y cann be interconnected. Only a single subscriber's line X and a single subscriber's line Y are shown in FIG. 1, but the network RC is of course capable of dealing with a number of subscribers X and Y.

Each line X and Y is connected to the network RC by way of a transformer TX and TY respectively, whose secondary is balanced by a balancer EX and EY respectively so as to separate or isolate the transmission channel from the reception channel of each line. There is in each transmission channel between the respective transformer TX, TY and the network RC an amplifier-modulator A1X, A1Y respectively and an encoder CX, CY respectively. In each reception channel there is between the network RC and the transformer TX or TY a decoder DX, DY respectively and an amplifier-demodulator A2X and A2Y respectively. If the sampling period is T and if the time slot allocated to the subscriber X is $t_X$, the AM signals representing the speech of subscriber X are passed to the subscriber Y at the instants of time $t_X$, $t_X + T$, $t_X + 2T$ and so on up to $t_X + nT$. Similarly, if a time slot $t_Y$ is allotted to the subscriber Y, the AM signals representing his speech will be passed to the subscriber X at the instants of time $t_Y$, $t_Y + T$, $t_Y + 2T$ and so on up to $t_Y + nT$. Network RC has means to store the speech signals between their reception on a time slot and their restoration on another time slot.

The system of FIG. 1 also comprises an operator's line OP which is connected to the network RC by way of a transformer TOP balanced by the balancer EOP. In the transmission channel of line OP there is an amplifier-modulator A1OP and a encoder COP between the transformer TOP and the network RC, the corresponding reception channel comprising a decoder DOP and amplifier-demodulator A2OP between the network RC and the transformer TOP.

The system shown in FIG. 1 is familiar and it is an object of the invention to improve it such that:

a. there can be talk between the operator and any correspondent X or Y connected to the network RC, and b. the operator can monitor a call between two correspondents X and Y who are interconnected via network RC, in which case it must be possible to superimpose a monitoring tone on the telephone speech signals.

Figure 2:
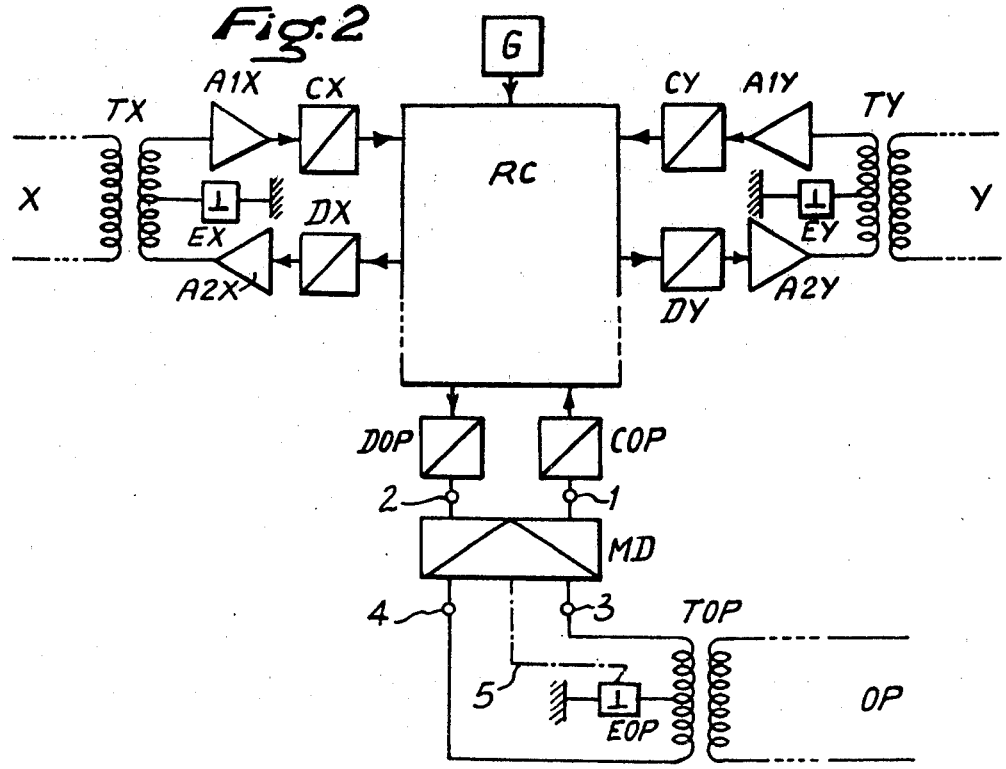
FIG. 2 is a diagrammatic view of an improved electronic time switching telephone system according to the invention.

Accordingly, therefore to the invention there is associated with the network RC a modulator demodulator system (Modem) MD which serves as an interface, on the one hand, between the operator's line OP and any reception line outputting AM telephone signals and, on the other hand, between the line OP and any transmission line outputting such signals. As can be seen in FIG. 2, the modem MD is accordingly connected to the encoder COP (terminal 1) and to the decoder DOP (terminal 2) and to the line OP by way of the transformer TOP (terminals 3 and 4). The modem MD replaces the amplifiers A1OP and A2OP and has provision for acting on the balancer EOP (connection 5) so as to interconnect the reception channel and the transmission channel in the case of monitoring. For monitoring a tone generator G connected to the network RC is provided.

Referring to FIG. 3, which serves to show how the invention operates, there can be seen the network RC, the modem MD, the tone generator G and only the encoders CX, CY, COP and the decoders DX, DY and DOP. Also, the various speech routes possible between X, Y and OP are indicated by dotted lines, chain lines and chain-dotted lines extending through the network RC. The modem MD is connected to the elements COP, DOP and OP by way of its terminals 1, 2, 3 and 4.

As previously mentioned, the network RC such as the one described in co-pending application Ser. No. 486,080, filed July 5, 1974, hereby incorporated by reference; in known manner makes transmission from X to Y possible through the agency of the connection 6 (dotted line) between the encoder CX and the decoder DY at the times $t_X$, $t_X + T$, $t_X + 2T$ and so on and makes transmission from Y towards X possible through the agency of the connection 7 (in dotted line) between the encoder CY and the decoder DX at the times $t_Y$, $t_Y + T$, $t_Y + 2T$ and so on. The modem MD is concerned in the following operations:

a. transmission from the operator OP to the correspondent X, e.g. at the times $t_1$, $t_1 + T$, $t_1 + 2T$ and so on by way of the connection 8 between the encoder COP and the decoder DX;

b. transmissions from the operator OP to the correspondent Y, e.g. at the times $t_2$, $t_2 + T$, $t_2 + 2T$ etc, by way of the connection 9 between the encoder COP and the decoder DY;

c. monitoring by the operator OP of speech from the correspondent X to the correspondent Y; to this end, a connection 10 is made, e.g. at the times $t'$, $t' + T$, $t' + 2T$ and so on between the encoder CX and the decoder DOP;

d. $t'$ by the operator OP of speech from the correspondent Y to the correspondent X; to this end, a connection 11 is made, e.g. at the time $t' + T/4$, $t' + T/4 + T$, $t' + T/4 + 2T$ and so on, between the encoder CY and the decoder DOP, and e. the hearing by everyone of the tone of the generator G when the operator OP is monitoring the call between X and Y; to this end a connection 12 is made, e.g. at the times $t' + 2T/4$, $t' + 2T/4 + T$, $t' + 2T/4 + 2T$ and so on, between the generator G and the decoder DOP, the connection between the generator G and the decoders DX and DY being by way of the modem MD.

FIG. 4 shows an embodiment of the modem MD which can provide all these operations in the case in which the transformer TOP is balanced by a resistance capacitance facility EOP disposed between the secondary center-point and earth. The modem MD has a modulation gate M whose output is connected to terminal 1 and whose input is connected to the output of an operational amplifier A1, the input thereof being connected to terminal 4. A capacitor $C_1$ is connected between earth and the input of gate M.

The operator's line OP goes to the primary of the transformer TOP whose secondary terminals are connected to the terminals 3, 4. The transmission and reception channels are isolated or separated from one another in known manner through the agency of a balancer EOP disposed between the secondary center-point of the transformer TOP and earth. The balancer can be shunted by a contact $a$, for instance, a static contact or a relay contact or the like. The modem MD also has a demodulation gate D whose input is connected to terminal 2 and whose output is grounded through a capacitor $C_2$ and is also connected to the positive input of an operational amplifier A2 acting as a separator or isolator. The negative input of amplifier A2 is connected to its output which drives a low-pass filter F. The output of filter F is connected to the positive input of a differential amplifier A3 whose negative input is connected via resistor R4 to its own output and to earth via a resistor R5 in series with a contact $b$ similar to the contact $a$. Contact $b$ is shunted by a resistor R11.

The output of amplifier A3 is connected to terminal 3 via resistor R6.

The modulator M, the demodulator D and the contacts $a$, $b$ are opened and closed by the central logical unit of the system such as shown in the above-mentioned co-pending application or shown in U.S. Pat. Nos. 3,668,329 and 3,903,509 incorporated herein by reference.

Consequently, when the operator OP speaks, the speech signals transmitted by the transformer TOP drive the amplifier A1 and, amplified thereby, energise the capacitor $C_1$ which serves as an energy store for signal sampling when the modulation gate M is closed. The speech signal appearing at terminal 1 is then routed along the connections 8 and 9 of FIG. 3 to the person doing the monitoring after, of course, having been given the necessary processing as regards switching, transmission and restoration into an AF current intelligible to the monitoring person.

Conversely, a signal from a correspondent (connections 10 and 11 of FIG. 3) reaches terminal 2 in the form of AM signals and goes therefrom to the demodulation gate D; the same closes upon the gating of a signal and charges the capacitor $C_2$ to the peak level of such signal.

The amplifier and isolator A2 serves to drive the low-pass filter F which in turn drives the amplifier A3 whose gain is determined by the negative feedback resistors R4, R5, R11.

The amplified signal appearing at the output of the amplifier A3 is therefore reinjected by the transformer TOP into the operator's line OP, and so the operator can hear the correspondents X and Y.

The signals transmitted by a correspondent can be heard by the operator OP; however, since the contact $a$ is in this case open and the balancer EOP is providing isolation between the reception and transmission channels associated with the operator OP, such signals cannot be returned to the correspondent who transmitted them.

In addition to providing a speech link between the operator and the correspondents, the system shown in FIG. 4 enables the operator OP to break into a call proceeding between two correspondents X and Y — i.e., X and Y can go on speaking, the operator hears them and can also talk to them.

As previously, let T denote the sampling period. The period of the AM signals selected by the demodulation gate D during speech between the operator OP and a correspondent is therefore T.

The time slot $t'$ can be allotted to speech between the operator OP and the correspondent X — i.e., for such speech the demodulation gate D will select the signals appearing at the times $t'$, $t' + T'$, $t' + 2T'$ and so on. Similarly, the time slot $t' + T/4$ can be allotted to speech between the operator OP and the correspondent Y — i.e., in the latter case the gate D selects the signals appearing at the times $t' + T/4$, $t' + T/4 + T$, $t' + T/4 + 2T$ and so on. The time slot $t' + 2T/4$ can be allotted to the tone generator G — i.e., signals for the generator G will appear at the times $t' + 2T/4$, $t' + 2T/4 + T$, $t' + 2T/4 + 2T$ and so on.

If the demodulator is closed at the times $t'$, $t' + T/4$, $t' + 2T/4$, $t' + T$, $t' + T/4 + T$, $t' + 2T/4 + T'$ and so on up to $t' + nT$, $t' + T/4 + nT$, $t' + 2T/4 + nT$ and so on, the capacitor $C_2$ charges up for 25% of the time to the level of the signals from the correspondent X, for 25% of the time to the level of the signals from the correspondent Y and for 50% of the time to the level of the tone generator signals.

The filter F mixes these signals and the amplifier A3 receives the demodulated signals with a different relative attenuation.

To restore the signals from the correspondents X and Y to a normal level, the contact $b$ is closed so as to vary the negative feedback of the amplifier A3 and to increase its gain by short-circuiting the resistor R11. The signal level output by the tone generator G can be weighted so that the listening-in tone is not disturbing.

The operator will therefore hear the signals from the correspondents X and Y and from the generator G.

The contact $a$, which closes simultaneously with the contact $b$, renders the balancer EOP inoperative; consequently, the modulator M receives the sum of the signals from the correspondents X, Y, from the generator G and from the operator OP. The signals which the modulator M outputs at terminals 1 are routed by the connection network RC to the correspondents X and Y, who can therefore hear all the speech and the generator G.

The modem MD shown in FIG. 5 is very similar to the modem of FIG. 4 and differs therefrom as follows:

The resistor R11 is omitted and that end of the resistor R5 which is remote from the resistor R4 is earthed directly;

The common point of the resistors R4 and R5 is grounded via a resistor R10 and the contact $b$;

The contact $a$ is disposed between the balancer EOP and ground, and

There is a resistor R12 between the terminal 4 and ground.

The modulator MD of FIG. 5 operates similarly to the modulator of FIG. 4. In FIG. 5 closure of the contact $b$ is a means of increasing the gain of the amplifier A3.

FIG. 6 shows how the invention can be used in a system wherein the transformer TOP is balanced through the agency of the transmission channel amplifier A1, the same therefore being an operational amplifier. In such a case terminal 4 of the secondary winding of transformers TOP is grounded and terminal 3 is connected to the negative input of amplifier A1 via a resistor R1. Such negative input is also connected to the output of amplifier A1 via a resistor R2. The gain of amplifier A1 is determined by the amount of negative feedback produced by the resistors R1 and R2. As in the previous case, a capacitor $C_1$ is connected between ground and the input of gate M. The reception channel of the modem MD of FIG. 6 also comprises a demodulator D, the capacitor $C_2$, the isolating amplifier A2, the filter F, the operational amplifier A3 with its negative feedback resistors R4, R5, R10 and the contact $b$ in series with the resistor R10.

The output of amplifier A3 is connected to terminal 3 via resistor R6 and to the positive input of amplifier A1 via resistors R7, R8 in series. Resistor R7 is shunted by a capacitor $C_3$. The positive input of amplifier A1 is earthed through a resistor R9 shunted by the contact $a$.

Operation of the facility shown in FIG. 6 is similar to operation of the previous embodiment, transmission being similar in all cases. So far as reception is concerned, a fraction of the amplified signal appearing at the output amplifier A3, such fraction or proportion being determined by the value of the resistor R6 and by the operator's line impedance as "seen" from the transformer TOP, is reinjected thereby into the operator's line. The other fraction of the amplified signal appearing at the output of amplifier A3, such fraction depending upon the values of the resistors R7 and R8, goes therethrough to the positive input of amplifier A1.

The values of the resistors R1, R2, R6, R7, R8, R9 are such that at high frequencies the signal from the amplifier A2 does not introduce appreciable disturbances at the output of the amplifier A1. By compensating for the parallel inductance of the transformer TOP, the capacitor $C_3$ helps to extend this effect towards lower frequencies.

As in the previous cases, on monitoring the amplifier A3 receives the demodulated signals with different relative attenuation, e.g. 12dB, for the signals from the correspondents X and Y and 6dB for the signals from the tone generator G. To produce a normal level for the correspondents X and Y, the central logic unit closes the contact $b$ so that the negative feedback operative in the amplifier A3 is varied. The contact $a$, which closes simultaneously with the contact $b$, renders the balancing of the amplifier A1 inoperative, and so the modulator M receives the sum of the signal from the correspondents X, Y, the generator G and the operator OP.

As will be apparent to the skilled addressee, this invention, although described with reference to a time switching system wherein the transmission and reception channel comprise respective encoders and decoders between the transformers and the connection network, is also of use for a time switching system not having such encoders and decoders but having a connection network with facilities for storing the speech signals.

I claim:

1. An electronic time switching telephone system having a connection network for interconnecting the lines of a plurality of correspondents and at least one operator line and controlled by a central logic control unit, each correspondent line and said operator line having transmission channel and a reception channel, said system comprising:
   a transformer connecting each correspondent line and said operator line to said connection network, each transformer having a primary winding and a secondary winding, said secondary winding forming part of said transmission and reception channels,
   a balancing network connected to the secondary winding for isolating said transmission and reception channels, and
   a modem unit connected between the secondary winding of the operator's transformer and the connection network, said modem unit having a transmission path and a reception path forming part of the operator's transmission channel and reception channel respectively, said reception path of said modem comprising a demodulator, a capacitor connected to said demodulator and charged thereby, a variable gain amplifier connected to said capacitor, said variable gain amplifier connected to provide signals to the operator's secondary winding, and said transmission path of said modem comprising an amplifier connected to receive signals from the operator's secondary winding, said amplifier connected to a capacitor and said capacitor connected to a modulator,
   said modem unit further comprising means for at least partially cancelling the action of the operator balancing network.

2. A system according to claim 1, characterized in that it comprises means for varying the gain of the variable-gain amplifier.

3. A system according to claim 2 characterized in that the means for varying the gain of the variable-gain amplifier and for cancelling the action of the operator's balancing network comprises contacts controlled by the central logic control unit said modulator and demodulator having contacts controlled by said central logic control unit.

4. A system according to claim 1, characterized in that the variable gain amplifier comprises an operational amplifier having a negative feedback resistor and means for varying the value of said negative feedback resistors.

5. A system according to claim 1, characterised in that a low-pass filter is interposed on the reception path between the capacitor and the variable-gain amplifier.

6. A system according to claim 1, characterized in that it comprises a tone generator connected to said connection network and operative on cancellation of the action of the operator's balancing network.

7. A system according to claim 1 in which the operator balancing network comprises a resistive arrangement disposed between ground and the center point of the secondary winding, said modem unit comprising a first contact connected in parallel with the balancing network and, a second contact connected for increasing the gain of the variable-gain amplifier.

8. A system according to claim 1 in which the operator balancing network comprises a resistive arrangement disposed between ground and the center point of the secondary winding, said modem unit further comprising a first contact connected in series with the balancing network, a second contact serving as a means of increasing the gain of the variable-gain amplifier, and a resistor connected between ground and the operator's secondary winding, said resistor positioned in the transmission path.

9. A system according to claim 1 wherein said amplifier in said modem transmission path is an operational amplifier having a first contact means disposed between ground and one input of the operational amplifier, another input of said operational amplifier connected to said operator transformer secondary winding and said modem unit further comprising a second contact means for increasing the gain of the variable-gain amplifier.

10. A system according to claim 6, characterized in that during a sampling period the modulator of the modem unit is switched consecutively at the instants of time of the signals corresponding to speech of two correspondents and at the instant of time of the signal associated with the tone generator.

* * * * *

UNITED STATES PATENT OFFICE
CERTIFICATE OF CORRECTION

Patent No. 3,976,841                 Dated  August 24, 1976

Inventor(s) Jean Picandet

It is certified that error appears in the above-identified patent and that said Letters Patent are hereby corrected as shown below:

Column 4, line 12, delete "t'" and insert therefor --monitoring--

Column 7, line 26, after "having" insert --a--.

Signed and Sealed this

Twenty-third Day of November 1976

[SEAL]

Attest:

RUTH C. MASON
Attesting Officer

C. MARSHALL DANN
Commissioner of Patents and Trademarks